E. S. SCRIPTURE.
Hub.
No. 3,979.
Patented Apr. 1, 1845.
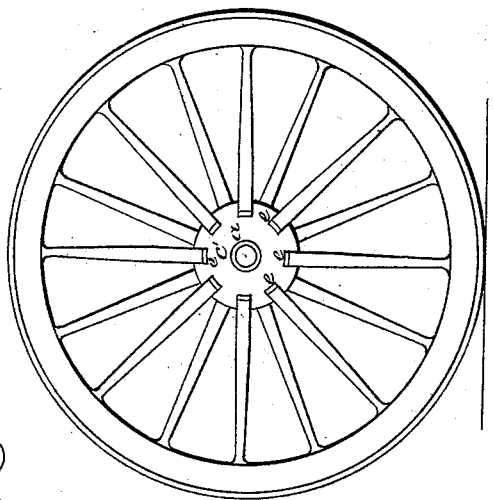
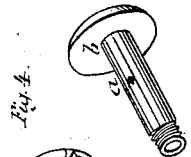
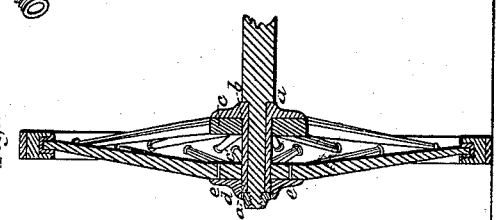
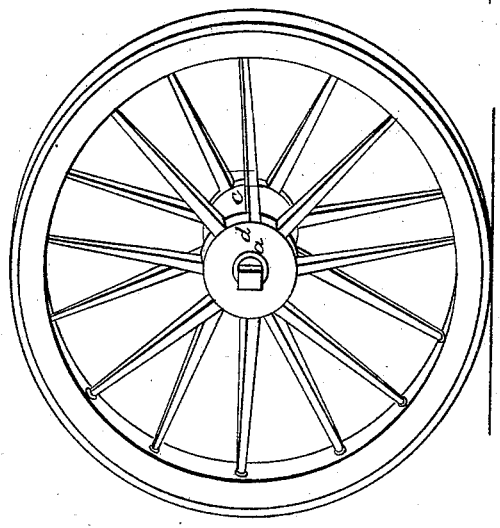

UNITED STATES PATENT OFFICE.

ELIPHALET S. SCRIPTURE, OF SYRACUSE, NEW YORK.

METHOD OF PUTTING TOGETHER OR CONSTRUCTING CARRIAGE-WHEELS.

Specification of Letters Patent No. 3,979, dated April 1, 1845.

*To all whom it may concern:*

Be it known that I, ELIPHALET S. SCRIPTURE, of the city, county, and State of New York, have invented a new and useful Improvement in Carriage and other Wheels; and I do hereby declare that the following is a full, clear, and exact description thereof, reference being had to the accompanying drawings, which form a part of this description, in which—

Figure 1 is a perspective elevation, Fig. 2, a side elevation with the outer plate of the hub removed, Fig. 3, a cross section in the line across the hub, Fig. 4, detached parts.

The nature of my invention consists in forming a wheel with the spokes so arranged, as to brace both ways and to be strained up by drawing the two rims of the hub together so as to force the ends of the spokes outward against the felly to tighten them.

It has been found difficult to use metallic hubs on common wheels on account of the wheels in the course of wearing getting rim bound when the rim ends of the spokes are soon cut out by the hub as they loosen. I obviate this difficulty by the following construction: A pipe (*a*) is formed as shown detached in Fig. 4, which may also serve for the box for the arm of the axle to run in; on the inside end of this pipe there is a flanch (*b*) that forms the inner end of the hub. Against this flanch a cheek piece (*c*) fits, which can be slid on or off the box (*a*), and in the face are made mortises (as shown in Fig. 4,) they being as wide at the bottom as at the circumference, so that the spoke may have a wide bearing at the inner end. In this cheek piece (*c*) every other spoke is put and enters at its other end into a felly bracing out as clearly shown in Fig. 3; another cheek piece (*c'*) of precisely similar construction is slipped on to the other end of the pipe box (*a*) and receives the other half of the spokes which are made to brace the reverse way; a nut (*d*) is then screwed on to the outer end of the pipe (*a*) which has a flanch as large in circumference as the cheek piece. This draws the two cheek pieces together and strains the wheel tight, the fellies and tire being made in the ordinary way. A wedge may be driven under any of the spokes to even them as shown at (*e*) Fig. 3.

Having thus fully described my improvement I wish it to be understood that I do not claim constructing wheels with the spokes standing bracing by projecting inner ends out from the plane of the wheel on each side, nor do I claim screwing the ends up firmly against a center permanent projection on the hub as that would not effect the object I have in view, which is to continually tighten the spokes and brace them out against the fellies as they wear loose. And

What I do claim as my invention which I desire to secure by Letters Patent is—

The combination of the pipe box (*a*) with the cheek pieces (*c, c'*) into which the spokes are inserted and fastened by plates on their outside, a space between said cheeks being left so that they can be forced toward each other to tighten the spokes as they wear loose or shrink, and by that means firmly brace the wheel, which can be readily taken to pieces, and any broken or defective parts replaced by perfect ones.

ELIPHALET S. SCRIPTURE.

Witnesses:
J. J. GREENOUGH,
LAFAYETTE CALDWELL.